United States Patent [19]

Meunier, deceased

[11] Patent Number: 4,879,172
[45] Date of Patent: * Nov. 7, 1989

[54] SUBSTRATUM FOR SOIL-FREE CULTIVATION

[75] Inventor: Jean-Paul Meunier, deceased, late of Clermont, France, by Xavier Gillet, executor

[73] Assignee: Isover Saint-Gobain, Paris, France

[*] Notice: The portion of the term of this patent subsequent to Sep. 6, 2005 has been disclaimed.

[21] Appl. No.: 155,738

[22] Filed: Feb. 16, 1988

Related U.S. Application Data

[62] Division of Ser. No. 860,574, May 7, 1986, Pat. No. 4,769,277.

[30] Foreign Application Priority Data

May 7, 1985 [FR] France ................................ 85 06916

[51] Int. Cl.$^4$ ............................................. D04H 1/08
[52] U.S. Cl. .................................... 428/280; 47/28.1; 428/221; 428/913
[58] Field of Search ............... 428/221, 280, 297, 298, 428/913; 47/28 R

[56] References Cited

U.S. PATENT DOCUMENTS

| 4,112,174 | 9/1978 | Hannes et al. | 428/280 |
| 4,310,585 | 1/1982 | Shannon | 428/280 |
| 4,451,276 | 5/1984 | Barthe et al. | 65/6 |
| 4,463,048 | 7/1984 | Dickson et al. | 428/280 |
| 4,481,241 | 11/1984 | Howashima et al. | 428/297 |
| 4,769,277 | 9/1988 | Meunier | 428/297 |

Primary Examiner—James J. Bell
Attorney, Agent, or Firm—Oblon, Spivak, McClelland, Maier & Neustadt

[57] ABSTRACT

Substrata for soil-free cultivation are characterized by a relatively low by-volume mass. They are also constituted of fine fibers. The substrata present the advantage of a high degree of water retention, even for small thicknesses.

18 Claims, 1 Drawing Sheet

SUBSTRATUM FOR SOIL-FREE CULTIVATION

This is a division of application Ser. No. 860,574 now U.S. Pat. No. 4,769,277, filed May 7, 1986.

BACKGROUND OF THE INVENTION

1. Field of the Invention

This invention pertains to fibrous substrata for soil-free or hydroponic cultivation.

2. Discussion of the Prior Art

The constantly developing practice of soil-free cultivation has led to the utilization of substrata of various natures, especially vegetable-derived fibrous materials, natural mineral products such as gravels and pozzolanas, or else processed mineral products such as expanded perlites or rock wools.

The choice of substratum depends at once on its characteristics which facilitate cultivation, good solution retention, good aeration, geometric and chemical stability, etc . . . , and economic data such as: cost of the substratum, replacement frequency, as well as the necessary investment, depending on the type of cultivation under consideration, which, can be related to the type of substratum utilized.

Among the processed mineral materials, rock wools present advantageous properties. They offer a very high degree of porosity, of about 95%, good water retention and good aeration. The material is also easy to handle due to its lightness. On the other hand, the cost of these substrata normally leads to multiple uses, for obvious economic reasons. These uses require disinfection, thus handling, which becomes increasingly difficult after successive cultivations because the structure of the material deteriorates. The deterioration of the material also causes a loss of porosity and sinking, which change the cultivation conditions.

Among the advantageous characteristics of the rock wool substrata, the "available" quantity of water retained presents a particular interest.

This characteristic determines the safety margin which is available to maintain the satisfactory moisture conditions. The greater this available water value is for a given volume of material, the greater the degree of safety. If the material presents a large quantity of available water, the feed of liquid to the substratum during cultivation can be effected at less frequent intervals. Still better, the volume of substratum which is necessary for cultivation can be decreased when the available water quantity per unit of volume increases.

The latter characteristic is of great practical interest. A smaller volume of substratum, and more precisely, a smaller amount of fibrous materials, leads to a less costly material. When this decrease in cost is sufficient, it can be accompanied by other advantages, in particular, below a certain threshold, the one-time use of substratum can be envisioned, which allows the elimination of the operations required for the sterilization of the substratum between successive cultivations.

SUMMARY OF THE INVENTION

The purpose of the invention is to provide new mineral fibrous substrata for soil-free cultivation. These mineral materials in accordance with the invention present characteristics such that the amount of available water is appreciably increased.

The inventors have highlighted the existing relations between water availability for fibrous substrata and the structural characteristics of these substrata. The inventors have especially been able to establish the conditions of by-volume mass and fiber fineness which are most satisfactory to produce a good available water reserve.

The substrata according to the invention present a by-volume mass which is under 50 kg/m$^3$ and preferably under 40 kg/m$^3$ with fibers whose average diameter is under 8 micrometers and preferably under 6 micrometers.

On an indicative basis, for rock wools which are traditionally utilized as substrata, the by-volume mass is ordinarily higher, and is in the range of 70–80 kg/m$^3$ or more. The substrata according to the invention are thus quite appreciably lighter than the traditional substrate.

This lightness does not have profound effects on porosity. Indeed, even the conventional substrata offer a high degree of porosity, of about 95%. In other words, in the substratum, the fibers occupy only 5% of the volume, with the rest corresponding to the space which can be occupied by water. Thus, a decrease in the by-volume mass does not substantially increase the available space for the solution. But the decrease in by-volume mass with a decrease in the average diameter of the fibers (and the multiplication of these fibers) seems to promote the development of the capillary actions which can explain the improvement in the substratum's increased water availability.

It must be emphasized that a reduction in the by-volume mass does not always necessarily imply a decrease in the diameter of the useful fibers, i.e., those which participate in the formation of the capillary network which retains water. Especially for rock wools, the production method causes the presence of a relatively significant proportion of "non-fibrous" particles. The term "non-fibrous" indicates particles having a diameter which is much greater than that of the fibers properly speaking, and which is set arbitrarily, for example, at over 40 micrometers. The proportion of nonfibrous materials often reaches, or even exceeds 30% of the total mass of the substratum. As mentioned above, considering the mass of these large particles, they contribute very little to the formation of the capillary network and thus to the solution retention properties. It is thus desirable to utilize products as much as possible which are free of nonfibrous materials, or which have very low contents thereof.

In practice, it is possible during the production process to modify the by-volume mass of fiber felts by compressing them essentially at the time of thermal treatment, which normally establishes their configuration. Thus, substrata are produced, having fibers of the same size, and which differ only by the by-volume mass (and less significantly, the overall porosity) thereof.

For substrata made from larger fibers, namely, those having an average diameter greater than 6 micrometers, it is noted that the available water increases as the by-volume mass increases. This explains why, in the case of rock wools, whose fibers in the most recent techniques and especially those utilized for the production of substrata, have a diameter of about 6 micrometers, the tendency is to implement heavy products.

With finer fibers, for example, 4.5 to 3 micrometers or less, which are also considered in accordance with the invention, the influence of the by-volume mass is much less appreciable. Thus, it is highly advantageous, in addition to what will be seen below with respect to the buckling of the substratum under the weight of the solution, to utilize very light felts having fine fibers.

This difference in behavior, here again, is probably explained by the constitution of a much larger capillary network with fine fibers.

If it appears to be advantageous to reduce the diameter of the fibers comprising the substratum, it is often difficult to pass below a certain limit for various reasons. A first reason is that the production of very fine fibers, for example, those under 1 micrometer, requires techniques at a cost which is unacceptable for cultivation substrata.

Another reason is, for example, that the felts formed from very fine fibers (and having very low by-volume masses) present a small degree of resistance to mechanical stress. They can especially sink under the weight of the solution which is absorbed.

For these reasons, it is advantageous according to the invention to utilize substrata whose fibers are between 1 and 8 micrometers and preferably between 2 and 6 micrometers.

The partial sinking of the saturated material mentioned above does not necessarily constitute an obstacle for use. For the lightest materials, a certain settling during wetting can be envisioned. In this case, it suffices to adjust the dry thickness of the substratum so that, in the damp state, the volume provided for the solution remains sufficient. As such, very light materials, whose by-volume mass can be as low as 15 kg/m$^3$ can be utilized in a satisfactory manner as substrata according to the invention.

Such products, even reduced, for example, to half of their initial volume under the mass of the solution with which they are saturated, still correspond to very low by-volume masses as compared to that of the conventional substrata.

The buckling which occurs in these materials does not change the cohesion thereof, and is reversible. As soon as the pressure caused by the presence of the solution is relieved, the substratum recovers its volume.

In addition to the advantages of production cost and quality with respect to water retention, the light substrata allow improved packaging and storage. Indeed, it appears that the conventional substrata are relatively rigid products, precisely because of their by-volume mass. They are especially incompressible and cannot be folded or rolled up. Conversely, light fiber felts are known for their good compressibility and further, for their ability to recover their thickness when the pressure is removed. In other terms, the light substrata in accordance with the invention can be compressed, rolled up into a small volume to facilitate the transportation and storage thereof. This capacity increases as the by-volume mass decreases.

Above, we mentioned the great importance of the available water retained by the substrata for the cultivation process was noted. If the capacity for root aeration is also an important factor, in practice, this aeration does not require a substantial fraction of the volume of the substratum to be occupied by air. Indeed, aeration occurs also by means of the oxygen which is dissolved in the nutritive solution, and this aeration is better ensured as the frequency of the replacement of the solution in contact with the roots increases. For this reason, although the substratum plays a role in aeration, the irrigation aspect takes priority.

More so than the quantity of water which is retained by the substratum, it is the available water which is important. Indeed, the water penetrating the substratum is essentially retrained by said substratum. If the water is bound too strongly to the substratum, it can no longer be utilized by the plant. Conversely, the substratum must exert a certain degree of retention, without which the irrigation solution would be immediately drained.

To characterize the retention of the substratum, the water content of samples is determined by subjecting it to pull forces. Thus, for a depression expressed as a function of the logarithm of the height of the water column (in cm), also called pF, the percentage of the volume of the substratum which is occupied by the aqueous phase is defined. Two values for pF are particularly important in characterizing the substratum: a low pF corresponding practically to the conditions of maximum retention and which is arbitrarily established at equal to 1 (or 10 cm on the water column) and a pF equal to 2, which in practice corresponds to the highest degree of pull which can be exerted, for example, by garden plants, and thus constitutes the lower dampness limit above which the substratum must be maintained on a constant basis.

The greater the protection of water extracted between these two pF values, available water, the better the substratum.

Various methods for determining water retention, which can produce slightly different results, have been proposed. The method adopted by the inventors is explained in detail in the examples for embodiment.

Experiments have shown that, for all of the mineral fiber substrata that retention is high at pF1 and very low at pF2, in comparison with the other types of natural or artificial substrata. However, differences can appear among these mineral fibrous substrata, especially for the values at pF1.

The substrata according to the invention have a high degree of retention at pF1 and thus a large available reserve. This available reserve is not under 40% and most frequently is greater than 50%.

For substrata comprised of extremely fine fibers and having very low by-volume masses, the retention capacity is determined using a dampened substratum, to take into account the substratum's propensity to buckle under the weight of the liquid impregnating it.

Due especially to this large quantity of available water, the substrata according to the invention comprised of very fine fibers can be utilized in smaller thicknesses than those traditionally used for rock wool-based substrata.

In practice, rock wool substrata proposed for soil-free cultivation are relatively thick, with said thickness normally exceeding 70 mm. Indeed, it seemed preferable, especially for reasons of durability and cost, but also undoubtedly for reasons related to the methods used in the cultivation process, to utilize relatively voluminous substrata.

Research conducted by the inventors has shown that soil-free cultivation could be effected advantageously on appreciably thinner mineral wool substrata. These substrata have a lower initial cost, which allows the conditions for implementation to be improved, especially through use of fewer cultivations and preferably for a single cultivation. Moreover, each cultivation can be conducted under more constant conditions.

The substrata for soil-free cultivation according to the invention are advantageously comprised of mineral wool felts, the thickness of which is not greater than 40 mm, and preferably is not greater than 30 mm. During tests conducted, it was discovered that such thicknesses, which are much smaller than those previously utilized, are perfectly compatible with good cultivation yields and without stifling growth. Indeed, it appears that the volume of the substratum offered to the plants is sufficient for satisfactory root development, without modifying the surface density of the plants. This volume is also sufficient to maintain a good feed of nutritive solution to the plants.

This small thickness of the substrata compared to prior substrata of the same type also allows for a better control of the nutritive solution which they are saturated. Indeed, solution consumption is practically identical whether a thick or thin substratum is used. The quantity of solution retained is smaller with the thin substratum and, with the supply of new solution relative to the mass of liquid being greater, the composition of the solution which is retained is constantly closer to that of the initial solution.

If it appears advantageous from the economic point of view to utilize thin substrata, in practice, said substrata must nonetheless provide a certain volume for solution retention and root development. Techniques exist in which growing is done without a substratum. In these techniques, the roots grow in the same container in which the nutritive solution circulates on a constant basis. This cultivation method requires a highly specialized installation and large investments. For these reasons, many users prefer cultivation methods in which the substratum is retained.

To maintain a sufficient quantity of solution and provide the roots with the volume necessary for their growth and still, without changing the surface density of the plants, the thickness of the substratum according to the invention is not less than 10 mm.

For most current cultivations, the mineral wool substratum according to the invention has a thickness of about 15 to 30 mm. The thickness which is chosen, in addition to the water retention capacity of the substratum, depends on the plants, the density thereof and the frequency of irrigation which is used. This thickness can possibly also depend on use for more than one cultivation, but, in this case, the use of these substrata does not provide all of the aforementioned advantages. It is specially necessary to envision a sterilization between the successive plantings.

The fibers comprising these felts can be produced from a variety of materials and using various techniques.

Up to the present, only "rock" mineral wools have been utilized to serve as substrata for soil-free cultivation. These rock wools are in fact made from inexpensive materials: basaltic rock, blast furnace cinders and similar materials.

These materials are traditionally processed according to techniques which produce felts containing a high proportion of non-fibrous materials. In use as cultivation substrata, the presence of these non-fibrous materials is of little consequence, but, as we have seen, makes the product heavy without improving the properties thereof. The essential for this production method is that it is relatively economical, which, combined with the low cost of raw materials, allows the production of substrata at prices which are comparable to substrata of different types.

On the whole, these substrata also possess a good level of chemical inertness.

The invention also envisions the use of glass wool felts. These felts, contrary to the former, normally present a great degree of homogeneity due to the method utilized for the production thereof. This pertains essentially to fibers which are formed by passing a melted material through a centrifuge drawing device. The absence of non-fibrous materials normally leads to felts which are much lighter and have similar mechanical resistance properties. In other words, the by-volume mass thereof is normally lower. This allows at least a partial compensation for the fact that their production is generally slightly more costly than that of rock wools.

Production techniques for glass fibers also present the advantage of the ability to produce fibers which are both very fine and very homogeneous, a fineness and homogeneity which cannot be obtained with rock wools.

It is thus possible to produce glass wool substrata having fibers with an average diameter of less than 3 micrometers, and which can be less than or equal to 1 micrometer, as mentioned above.

In the case of the thin substrata according to the invention, the structural properties must be still better ensured, and, as a general rule, glass wool felts present advantageous properties from this point of view, because of the both the fineness of the fibers and the homogeneity thereof.

Moreover, the reduction in the volume of the substratum envisioned according to the invention tends to limit the relative share of the cost of the fibers in the final cost of the product, such that the differences on this point between rock wools and glass wools are less appreciable.

Prior to the invention, the possibility of utilizing glass wool as a cultivation substratum raised objections, especially because of its assumed lack of chemical inertness. Indeed, it was feared that the glass fibers in contact with the nutritive solution would release a large quantity of sodium ions. Cultivation tests conducted with glass wool materials according to the invention have shown that these substrata yielded results fully comparable to those obtained with rock wool cultivation. In fact, a slightly higher sodium ion content is generally noted during the first irrigation. But this content, which is acceptable, subsequently decreases very quickly, settling at values which are similar to those obtained with rock wools. These results are all the more interesting that, due to the use of very fine fibers, exchanges with the solution are greater. For the intended use, the inertness of glass fibers in current use can thus be considered as completely satisfactory.

Quite obviously, the glass compounds chosen do not contain elements which are toxic for plants.

Conversely, it is possible to consider the utilization of fibers which are not systematically inert. Fibers can serve, for example, as a source of trace elements which diffuse slowly in contact with the nutritive solution or can contain phytopathological compounds.

Most often, however, it is preferable to make the fibrous substratum perfectly inert and to reserve the role of supplying the necessary elements for growth to the nutritive solution.

Mineral fiber felts are normally bound using organic bonding materials such as phenolic plastic resins. These resins have no appreciable influence on cultivation at the levels at which they are normally used, namely about 2 to 3% by weight of substratum.

The proportion of bonding material can vary according to the nature of the fibers, thus, for very fine fibers and low by-volume mass felts, the gravimetric proportion tion of the bonding material can be slightly higher, normally without exceeding 10%.

It must be noted that, if the mineral fibrous substrata are normally derived from products utilized for insulation, the composition of the bonding materials can be appreciably different. Indeed, it is common to add compounds intended to change the properties of the felts to the resin. The composition of the bonding materials can especially include substances which give insulation felts improved resistance to humidity. This pertains, for example, to silicone-based products. Bonding agents which do not contain these hydrophobic products are utilized in the production of the substrata according to the invention.

In addition, even if non-hydrophobic bonding materials are utilized, it is noted that the traditional substrata made of rock wool are very difficult to moisten if they are not impregnated with a certain quantity of an appropriate surface-active agent.

The introduction of the surface-active agent can be done, for example, in the manner which is described in the French Patent Application published under No. 2,589,917.

The surface-active agent is chosen so that it has no harmful effects on cultivation. It can especially pertain to non-ionic agents, such as the product which is marketed under the name of "Dobanol 91-6".

The utilization of very fine fibers according to the invention, by modifying the capillarity of the substratum, can make the use of a surface-active agent unnecessary. This is noted especially with glass wool substrata, whose fibers have an average diameter equal to 4.5 micrometers, but the hydrophilic nature of the fibers changes in a progressive manner. For each degree of hydrophilicity, it is possible to associate a maximum fiber size which allows this degree to be attained.

The substrata according to the invention are also distinguished, if needed, by the manner in which they are implemented. Indeed, if the general process of cultivation is maintained, when the volume of the substratum which is used is decreased, in other words, when the substratum is thin, the conditions for irrigation to meet the requirements of nutritive solution on a constant basis are different.

Generally, the substratum is utilized with either one-cycle or recycled solution irrigation. In the first case, the substratum is fed either by percolation or sub-irrigation, so as to keep the solution content within acceptable limits. The purpose of the essentially discontinuous supply is to compensate losses of solution due to absorption by the plants and evaporation. In the second case, the substratum is fed in a constant manner, and the excess solution which is not retained is recycled after it is supplemented and the content of its various constituents is readjusted.

With the "reserve" of solution offered by the thin substrata being smaller, when the irrigation is discontinuous, the latter is replaced more frequently, but with smaller quantities of solution. This greater frequency, as we mentioned above, allows a better adjustment of the composition of the nutritive solution near the roots.

The modification of the irrigation frequency does not constitute a problem to the extent that this operation is normally conducted in an entirely automatic manner following a pre-established schedule, and the execution of which is ensured by a complex of measurement, dosage and distribution equipment without the intervention of the operator.

The invention is described in detail below, in reference to the drawings, in which:

DETAILED DESCRIPTION OF THE EMBODIMENTS

Figure 1:
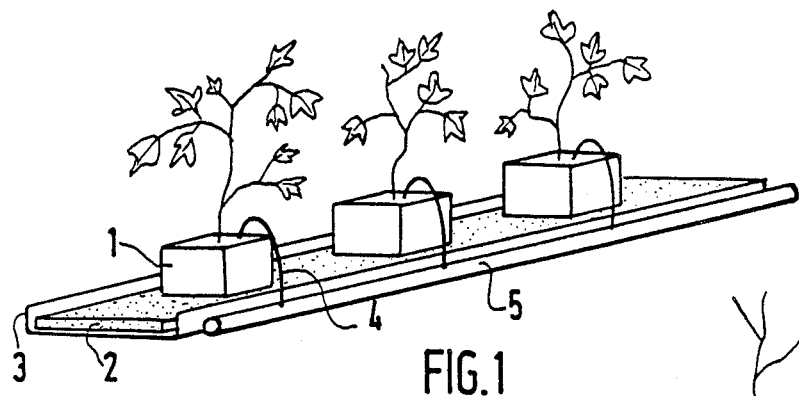
FIG. 1 shows a schematic cross section view of a cultivation device utilizing substrata according to the invention.

The plants which are utilized for cultivation can be prepared on soil or on an inert substratum, of the same type which is utilized for cultivation or otherwise. Finally, they are separated from each other with a form 1 which is intended to be placed on the growing substratum 2.

For cultivation, the substratum is placed on a water-proof container 3 which prevents loss of the nutritive solution. The container is normally comprised of an inert, relatively rigid polymer sheet which is held in the form of a trough or box by regularly placed stakes. The latter are not shown in the drawing.

This arrangement is normally supplemented by the presence of a water-proof sheet covering the substratum, with the exception of the areas where the forms are placed, having the function of reducing evaporation of the nutritive solution held in the substratum through contact with the surrounding atmosphere. This sheet is not shown in FIG. 1 for clarity.

The nutritive solution in the method which is shown is distributed by percolation, through capillary tubes 4, directly on the forms 1. The capillary tubes are fed by a distribution conduit 5.

The container 3 can be placed on the base, or, in the traditional manner, on an insulating sheet made, for example, of polystyrene.

The complex can also include heating equipment, located especially directly above the containers.

The nutritive solution can be distributed in a continuous manner, especially when recycling is planned. In this case, the base is placed so that the excess solution which exudes from the substratum can flow and be collected on the side or at an end of the container to be sent to the feed equipment. It can also be distributed in a discontinuous manner, either at predetermined intervals and quantities which are known to provide the appropriate dampness level for the substratum, or as a function of a constant measurement of the dampness rate which allows the feed to be activated when this dampness falls below a certain level.

Figure 2:
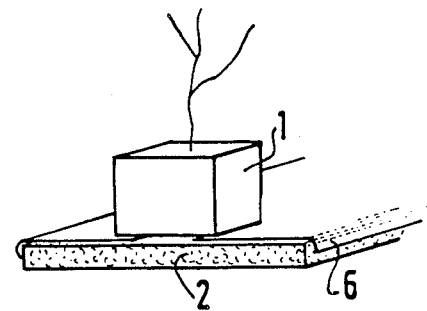
FIG. 2 is a larger scale view of another embodiment for the substrata according to the invention.

FIG. 2 shows a mode of embodiment for a substratum according to the invention, in which the mineral fiber felt comprising the substratum is covered with a flexible water-proof sheet 6 to prevent evaporation. The substrata according to the invention can be made with the upper surface of the substratum alone covered with this sheet. Said sheet can also completely surround the felt.

Figure 3:
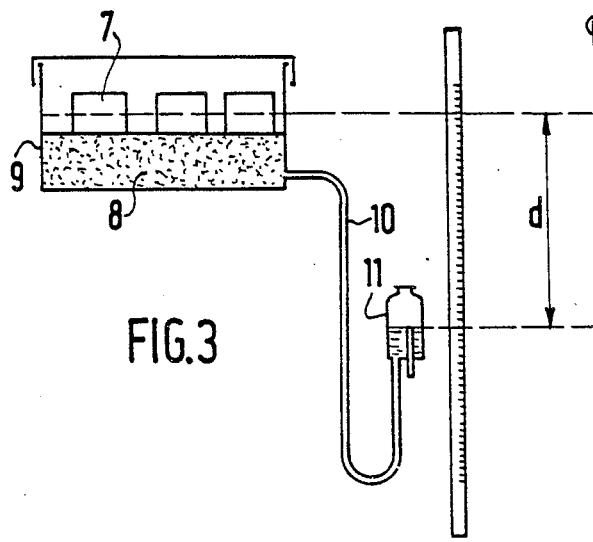
FIG. 3 shows the device utilized for water retention measurements.

FIG. 3 shows the device utilized to determine the water retention in the substrata for different pF levels.

For said determination, these samples 7 of material comprising the substrata at all 7.5 cm high and are cut into 10 cm side squares.

These samples are immersed completely for 1 hour, then placed on a porous material 8 lining the bottom of a box 9. The porous material, a bed of sand, for example, is initially saturated with water.

The bottom of the box 9 is connected by a flexible conduit 10 to a vessel 11, the level of which is fixed (by an overflow system). The position of the vessel 11 on a vertical support can be adjusted as desired.

The measurement of the depression d is done systematically by referring to the midpoint of the sample. Various levels are successively determined, corresponding to the pFs being studied. The measurements are made after the samples have been maintained up to the obtention of an equilibrium in each new condition of level change.

At equilibrium, the sample is removed, weighed, dried and weighed again after drying. The difference yields the mass of water retained and subsequently the proportion of water and air for each pull condition established.

The retention curves as a function of pF for various materials allow their ability to ensure a good irrigation for cultivation to be compared.

Figure 4:
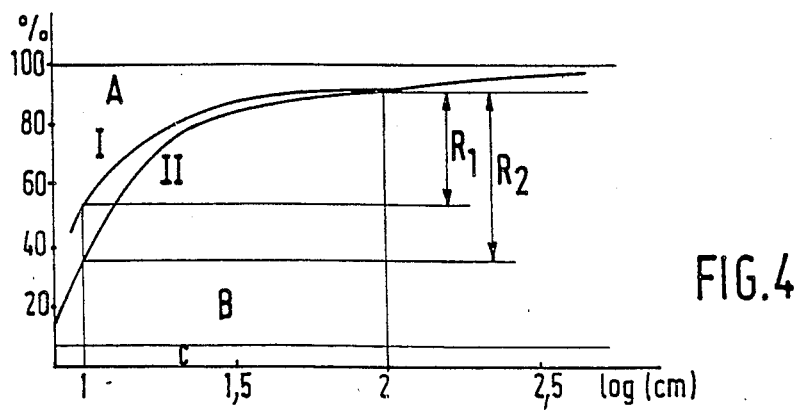
FIG. 4 is a graphic representation of the distribution of the water - air phases in a substratum according to the invention, as a function of the pull which is exerted.

These curves, for mineral fibrous materials, are shaped as shown in FIG. 4. For these curves, the abscissa shows the logarithms for the pulls in water column centimeters; the ordinate shows the percentages of the volume of the substratum occupied by water, air and fiber. The latter, in a constant manner in the example shown, occupies about 5% of the total. These percentages define the areas respectively labeled A, B and C on the diagram.

The differences in percentage between pF1 and pF2 for the portion occupied by water determines the available quantity of water.

For mineral fibrous substrata, pF2 is always very low, with the main differences noted between the various materials for available water thus stemming from pF1. Curves I and II illustrate this type of differences. They correspond respectively to a traditional rock wool-based substratum and a substratum according to the invention, having very fine fibers, for a same by-volume mass. The actual reserve $R_2$ is appreciably greater in the second case.

The conditions under which the measurements are taken (thickness 7.5 cm of sample) correspond to the traditional substrata. If these conditions allow the products to be compared, they do not reveal the advantages peculiar to the thin substrata proposed according to the invention.

The study of the distribution in the height of the sample in fact shows a very high degree of non-homogeneity. The upper part holds very little water and a great deal of air, and the opposite applies for the lowest part.

Systematic measurements were thus taken for different products according to the invention and others which do not have the accepted characteristics, on a comparative basis. These measurements cover products having different by-volume masses, fiber fineness and thicknesses, but which are made of the same glass and with the same quantity of wetting agent, of about 300 g/m³ of felt.

The retention measurements at pF1 taken for different fiber diameters, two series of by-volume mass and two thicknesses are as follows:

| Thickness in mm | kg/m³ | Diameter micrometers | | |
|---|---|---|---|---|
| | | 8 | 6 | 4.5 |
| 80–85 | 80 | 61 | 86 | 95 |
| 80–85 | 40 | 46 | 57 | 81.5 |
| 20 | 40 | 25 | 54 | 86 |

In all cases, these results show an increase in retention for a decrease in the average fiber diameter. This increase becomes greater as the by-volume mass and thickness decrease.

By choosing small thicknesses and a low by-volume mass, a great degree of retention can be obtained when the fibers are sufficiently fine.

The measurements done on a same felt and for different thicknesses evidence a great degree of stability in retention for felts comprised of very fine fibers.

At the different thicknesses studied, the felt comprised of fibers having an average diameter of 4.5 micrometers and of 40 kg/m³ present the following retentions:

| thickness (mm): | 20 | 35–40 | 55–60 | 80–85 |
|---|---|---|---|---|
| retention: at pF1 | 86 | 85 | 87 | 81.5 |

Taking into account the error inherent in this type of measurement, the differences found are insignificant.

According to the measurements taken, it seems that in the case of felts having high by-volume masses and especially comprised of fibers with larger average diameters, the thickness influences retention, with said retention being appreciably lower than the thickness decreases.

Moreover, it must further be emphasized that only fine fiber felts are suitable for use without a moistening agent.

Taking these results into account, it thus appears totally advantageous to utilize thinner substrata with fine fibers.

Two types of substrata were utilized: the first is comprised mineral wool panels made from blast furnace cinders, the second of glass wool panels.

The respective composition of the fibers in these substrata is as follows:

| Casting cinder fibers | | Glass fibers | |
|---|---|---|---|
| $SiO_2$ | 42.8% | $SiO_2$ | 66.9% |
| $Al_2O_3$ | 11.9% | $Al_2O_3$ | 3.35% |
| CaO | 38.7% | $Na_2O$ | 14.7% |
| MgO | 3.6% | $K_2O$ | 1% |
| $Fe_2O_3$ | 1.2% | CaO | 7.95% |
| MnO, $B_2O_3$ | (0.4% | MgO | 0.30% |
| $TiO_2$, $P_2O_5$ | ( | MnO | 0.035% |
| $SO_3$ | 0.3% | $Fe_2O_3$ | 0.49% |
| Misc. | 1.1% | $SO_3$ | 0.26% |
| | | $B_2O_3$ | 4.9% |

The substratum panels are bound with a formophenolic resin in a proportion of about 2.5% by weight of the entire product. In the case of rock wools, the substratum also contains about 1% surfaceactive agent.

The panels are cut to the size of 1000×200 and have a thickness of 50 mm for rock wool and 25 mm for glass fiber. The average diameter of the fibers is 5 micrometers for the rock wool (non-fibrous materials not counted and 4 micrometers for the glass wool.

The respective by-volume masses of the rock wool substratum is 40 kg/m³ that of the glass fiber substratum is only 25 kg/m³ corresponding to respective porosities of 95 and 98%.

Water retention at pF1 for these substrata is in both cases approximately equal to 70%. Consequently, in both cases, a good water/air equilibrium occurs, which promotes growth.

The growing of Montfavet type tomatoes is effected in a greenhouse according to the methods indicated below.

The sewing is done on 70×75×60 mm blocks of rock wool of the same type as the substratum mentioned above. Placement on the substratum is effected when the first leaves appear.

As a comparison, cultivation is also done on a traditional rock wool substratum, having a thickness of 75mm and a by-volume mass of 70 kg/m³ with average fiber diameters therein being 6 micrometers.

For the three types of substratum, the growing process is the same. The plants are 30 cm apart in the direction along the length of the substratum, which corresponds to a planting of 2.5 plants per square meter of the cultivating device. The feed illustration is the type described above in relation to FIG. 1.

Irrigation is done with a Coic-Lesaint type solution containing 12.2 milliequivalents per liter of nitric nitrogen, 2.2 milliequivalents per liter of ammonia nitrogen and 2.2 milliequivalents of phosphate. The pH is controlled at around 6.

The plants are fed in a discontinuous manner as a function of the conductivity measurement in the solution contained in the substratum. The feed maintains a conductivity above the threshold corresponding to a content which is not less than 12 milliequivalents of nitrogen per liter.

About 24 weeks pass from the planting until the end of the harvest.

The yield in all cases was about 6.5 kg per foot. Especially, there was no marked difference noted between the cultivation conducted on the thick or thin rock wool substratum. There was also no appreciable difference noted with respect to the yield, between the cultivation on thin rock wool and glass wool substrata.

A better structural tolerance was noted in the glass wool substrata, despite their relatively smaller by-volume mass. This is probably due to the presence of longer fibers, which reinforce the cohesion of the felt.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. Substratum for soil-free cultivation formed of a mineral fiber felt whose by-volume mass is less than 50 kg/m³.

2. Substratum according to claim 1, whose by-volume mass is between 15 and 40 kg/m³.

3. Substratum according to claim 1 or claim 2, in which the average diameter of the fibers is less than 8 micrometers.

4. Substratum according to claim 3 in which the average diameter of the fibers is between 2 and 6 micrometers.

5. Substratum of claim 1, whose thickness is between 10 and 40 mm.

6. Substratum of claim 1, comprised of a glass fiber felt.

7. Substratum according to claim 1 having, a proportion of available water which is not under 40%.

8. Substratum according to claim 7, whose available water reserve is not less than 50%.

9. Substratum according to claim 6, which does not contain a surface-active agent.

10. Substratum according to claim 9 in which the average diameter of the fibers is under 4.5 micrometers.

11. A method for growing a plant in a soil-free cultivation medium, comprising contacting said plant with a substratum for soil-free cultivation formed of a mineral fiber felt whose by-volume mass is less than 50 kg m$^{-3}$ of which least one of the surfaces is covered with a water-proof sheet.

12. The method of claim 11 wherein said by-volume mass is between 15 and 40 kgm m$^{-3}$.

13. The method of claim 11 in which the average diameter of said fibers is less than 8 μm.

14. The method of claim 12 in which the average diameter of said fibers is less than 8 μm.

15. The method of claim 13 in which the average diameter of said fibers is between 2 and 6 μm.

16. The method of claim 14 in which the average diameter of said fibers is between 2 and 6 μm.

17. The method of claim 11 wherein said substratum has a thickness of between 10 and 40 mm.

18. The method of claim 11 wherein said substratum is comprised of a glass fiber felt.

* * * * *